Jan. 15, 1924.
A. T. LEAVITT ET AL
1,480,824
ORE ROASTING FURNACE
Filed Nov. 22, 1920     5 Sheets-Sheet 1
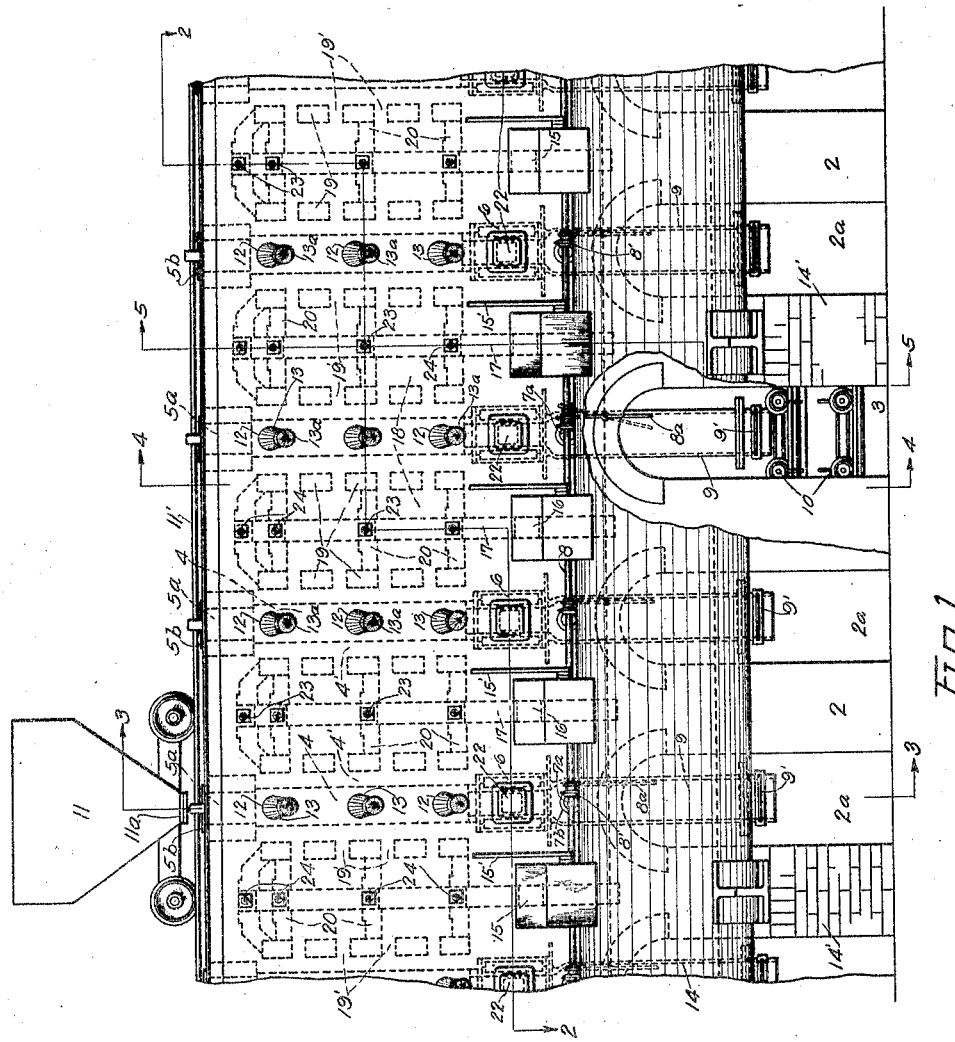
INVENTOR.
AVERY T. LEAVITT
CHARLES H. HUGHES
BY *Harry D. Wallace*
ATTORNEY.

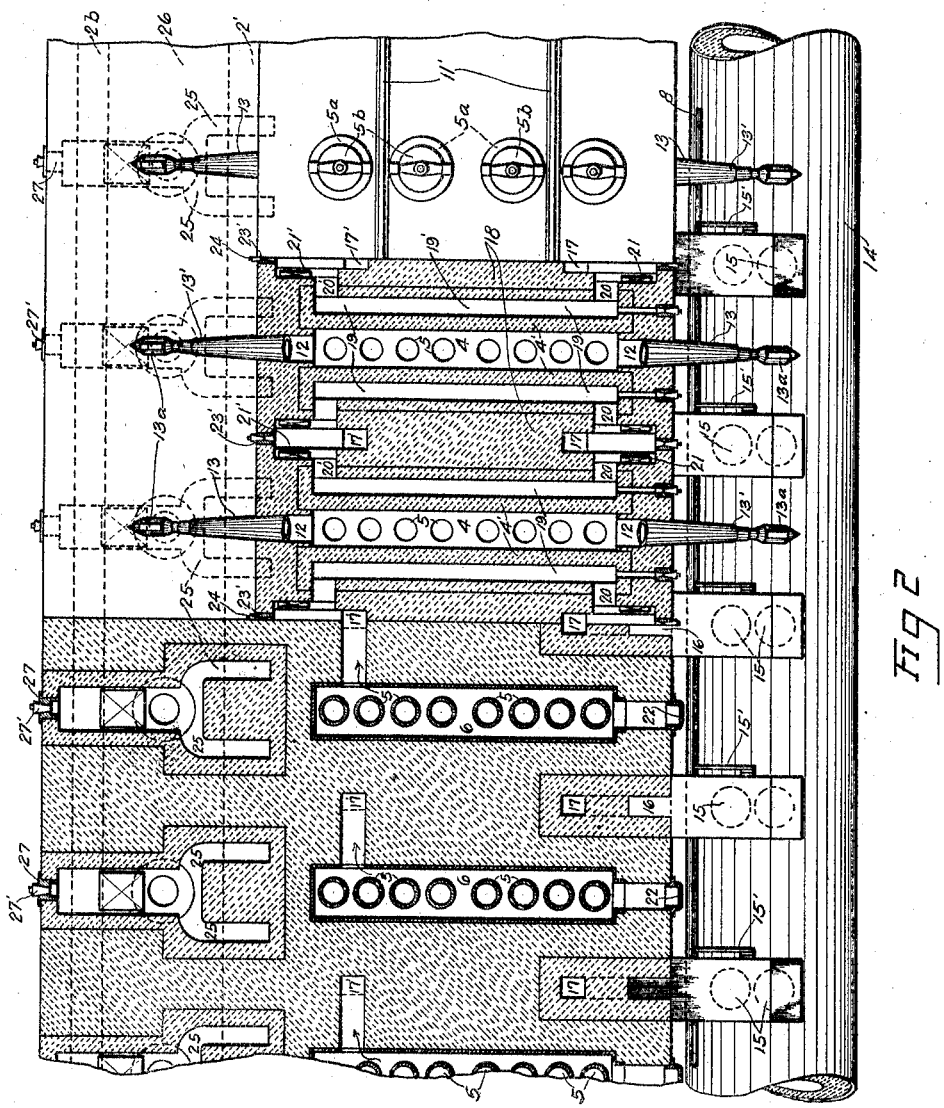

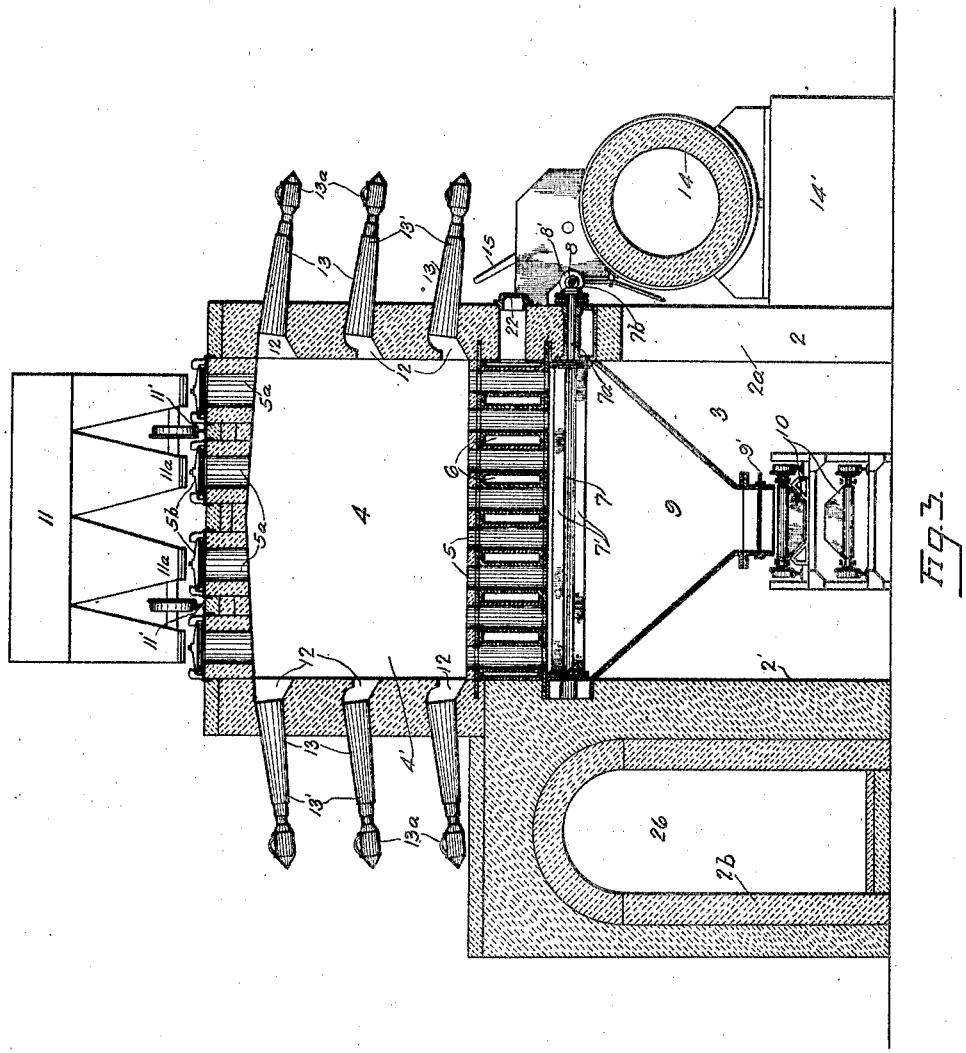

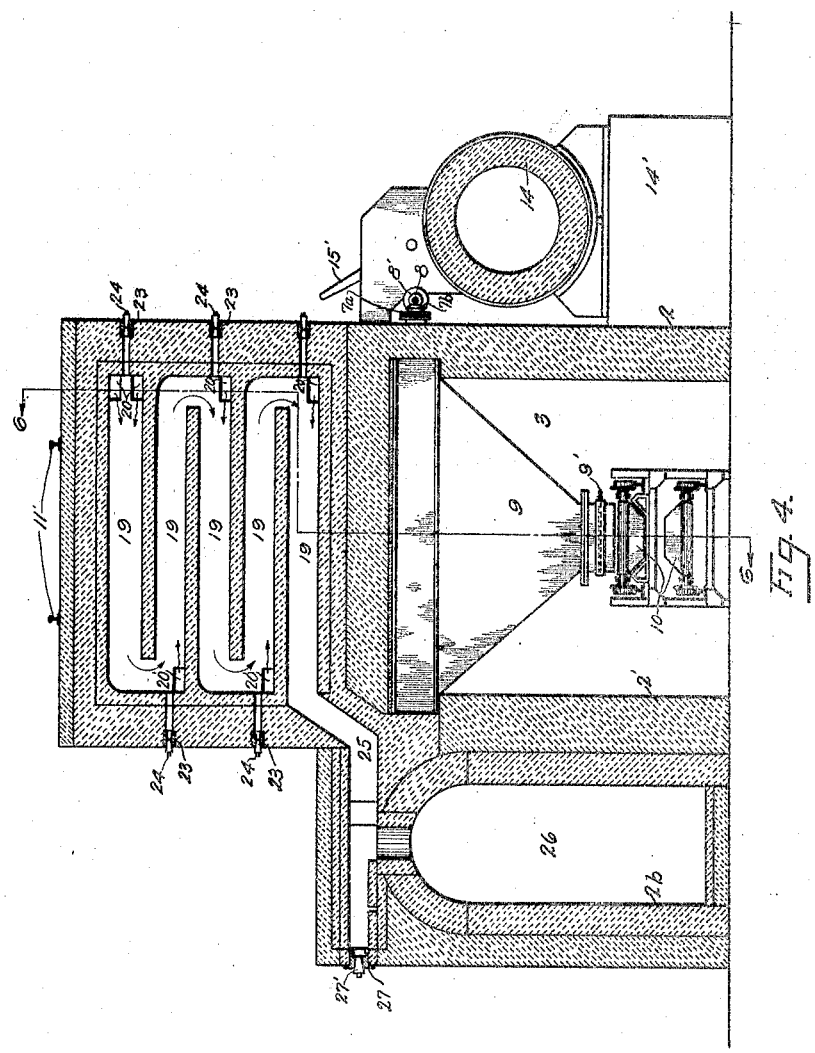

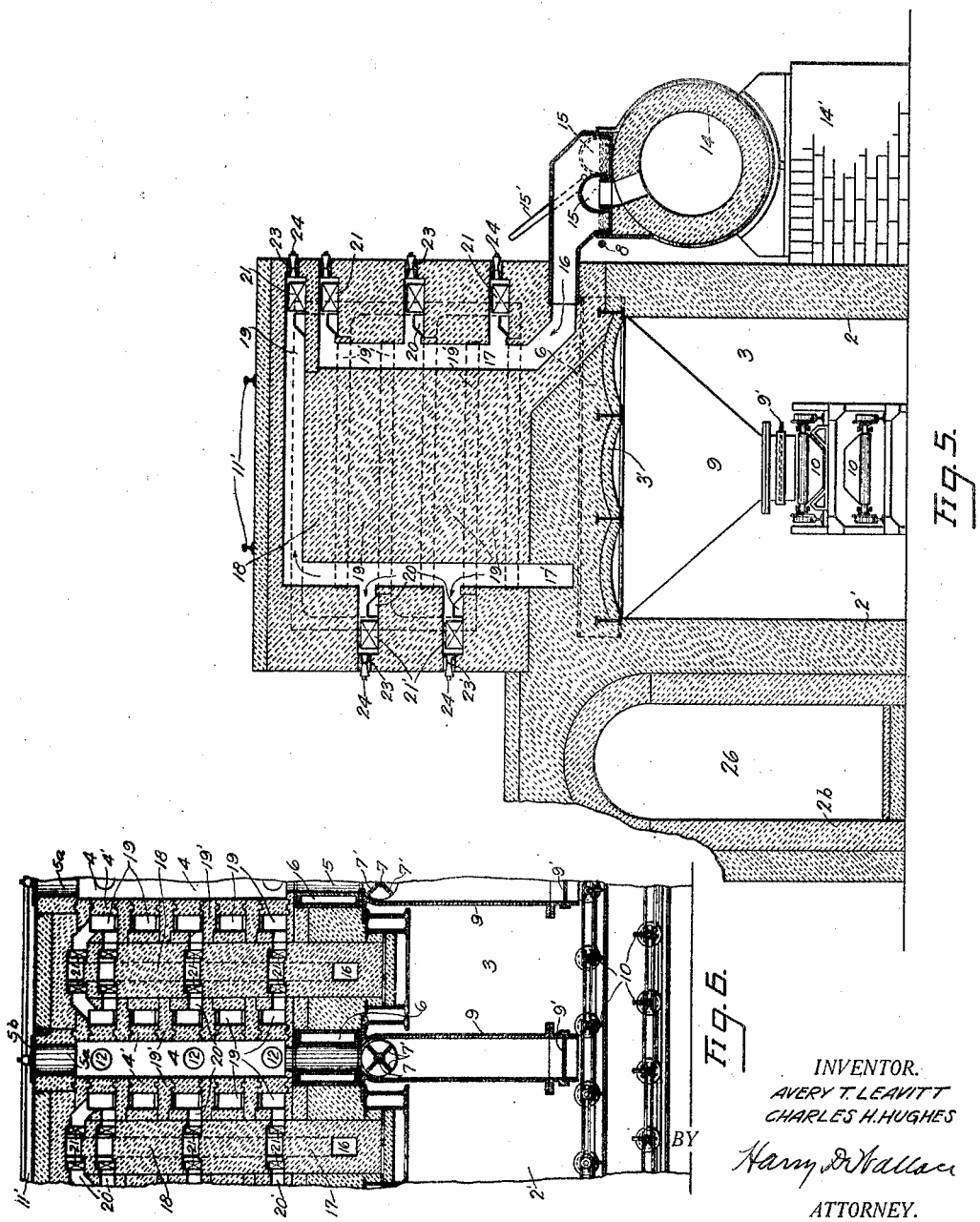

Patented Jan. 15, 1924.

1,480,824

UNITED STATES PATENT OFFICE.

AVERY T. LEAVITT AND CHARLES H. HUGHES, OF SYRACUSE, NEW YORK.

ORE-ROASTING FURNACE.

Application filed November 22, 1920. Serial No. 425,809.

*To all whom it may concern:*

Be it known that we, AVERY T. LEAVITT and CHARLES H. HUGHES, citizens of the United States, residing at Syracuse, in the county of Onondaga and State of New York, have invented certain new and useful Improvements in Ore-Roasting Furnaces, of which the following is a specification.

This invention relates to improvements in ore roasting or smelting furnaces, and the invention relates particularly to a furnace designed for the distillation of zinc.

The object of the invention is to provide an ore roasting furnace of the class adapted for continuous operation, which is novel and simple in construction, and whereby a greater economy may be effected in its operation, and a greater percentage of zinc and by-products may be recovered, than by any of the older furnaces and methods known to us. A further object is to provide a furnace, wherein the removable retorts heretofore employed in furnaces of the class are eliminated, and providing in lieu thereof a plurality of independent vertically arranged roasting chambers, which are capable of being heated and regulated collectively or separately at will, and wherein the roasting of the zinc bearing ore is accomplished entirely by radiated heat which is produced by burning gas, which is suitably mixed with pre-heated air, in a series of novel and simple flues which are disposed in the linings at the opposite sides of the roasting chambers. A further object is to provide novel and simple means for introducing the unroasted mixture comprising the ore combined with carbon into the tops of the roasting chambers, and also novel means for discharging the residue or refuse from the bottoms of said chambers, the charging and discharging of the said chambers being effected by gravity, and being controlled by novel and simple regulating means, which avoids waste and loss of the products of the reduction, as well as loss and waste of the heat required for the distillation of the zinc. A further object is to provide means for taking the zinc vapor from each of the roasting chambers independently at different levels or elevations, and collecting the liquefied and unliquefied zinc in suitable condensers, from which the products of the reduction may be readily and conveniently removed without interrupting the continuity of the smelting operations. And a further object is to provide a common chimney which collects the waste heat from the roasting ovens and carries it away to be utilized for making steam.

We attain these objects by the means set forth in the detailed description which follows, and as illustrated by the accompanying drawings, in which—

Figure 1 is a broken side elevation of the furnace comprising several independent ore roasting ovens which are combined in one structure. Fig. 2 is a horizontal section and partial top-plan view, the section being taken substantially on line 2—2 of Fig. 1; showing certain of the lining flues in relation to the ore roasting chambers, the connection between the combustion flues and the common chimney, and the manner of applying the condensers; also showing the disposition and arrangement of the tubes employed for discharging the refuse and for preheating the air before it is mixed with the gas. Fig. 3 is a vertical cross-section, taken on line 3—3 of Fig. 1. Fig. 4 is a similar cross-sectional view, taken on line 4—4 of Fig. 1. Fig. 5 is a similar sectional view, taken on line 5—5 of Fig. 1. Fig. 6 is a vertical longitudinal section through the oven linings showing the oven regulating dampers; also showing one of the recuperating-refuse tubes in relation to the corresponding refuse hopper.

The foundations upon which the furnace is built are omitted throughout the drawings.

In the drawings, the furnace proper comprises several independent ore roasting units, which are supported by two upright longitudinal walls 2—2', which may be made of brick or other suitable material. These walls are spaced apart to provide a relatively broad and deep tunnel 3, which preferably extends the entire length of the furnace. The wall 2 is provided at regular intervals with transverse arched openings 2$^a$ for access to the tunnel 3 and for facilitating the operation of the mechanism which controls the discharge of the refuse. The top of the tunnel 3, except directly beneath the ore roasting chambers 4, is closed by an arch formation 3', which partially supports the vertical oven linings and division walls, as well as a series of vertically arranged refuse tubes 5, which form the perforated bottom of the chambers 4. The tubes 5 are disposed in spaced relation in transverse rows in compartments 6 which are disposed directly beneath the ovens 4. Directly beneath each row of tubes 5 is a long horizontal rotatable valve 7, the opposite ends of which are pivotally supported by the walls 2—2'. The valves 7 are provided with radial wings 7' (see Figs. 3 and 6) and are employed for regulating the discharge of the residue or refuse from the individual roasting chambers 4 which gravitates through the tubes 5. By this construction and arrangement of the valves 7, substantially equal measured quantities of the reduction refuse may be drawn off from the several roasting chambers 4. The valves 7 are provided with stems 7ª, which project through the wall 2 and their outer ends are fitted with miter-gears 7ᵇ, which mesh with and are driven by similar gears 8', the latter being carried by a common operating shaft 8, which preferably extends the whole length of the furnace, as shown in Fig. 1. The gears 8' are preferably shiftable on the shaft 8 by means of levers 8ª for regulating the dumping of the refuse. The valves 7 dump the refuse into corresponding individual hoppers 9, which are disposed between and are supported by the walls 2—2', and from the hoppers 9 the refuse is discharged into suitable endless conveyors 10, which travel the length of the tunnel 3. Each hopper 9 is provided with a slide-gate 9' which is preferably operable by hand for discharging the refuse into the conveyors.

The ore roasting ovens 4 are preferably narrow transverse upright chambers, which are lined on all sides with fire or similar refractory bricks, as 4', for withstanding the intense heat required for roasting the ore and effecting the proper distillation of the zinc. The tops of the roasting chambers 4 are provided with a plurality of filling or charging manholes 5ª, through which the ore and coal are admitted by gravity from lorry or charging cars 11. Prior to the charging of the ovens 4, the ore and carbon are suitably crushed and mixed in a well-known manner. The cars 11 are operated on tracks 11', which are laid on top of the furnace. Each manhole 5ª is provided with a tight fitting cover 5ᵇ, which is held in place by suitable fastening means (not shown) for preventing the escape of the heat and gases during the roasting or smelting operations. At the opposite ends of the roasting chambers 4, three or more openings or vents 12 are provided at different elevations for the escape of the zinc vapor, which results from the roasting of the ore, and in these openings are disposed the usual condensers 13, which receive the zinc vapor, and collect the zinc which liquefies from the proper cooling of the vapor. The condensers 13 decline at a slight angle, as shown in the drawings for facilitating the gravitation of the liquid zinc towards their outer ends, where mud dams are provided at the point 13' for collecting the zinc. These dams are withdrawn from time to time for the removal of the zinc, and are then replaced by new dams. The outer ends of the condensers 13 are fitted with the usual prolongs 13ª, which are usually telescopically applied and readily detachable for removing the blue powder and dust, which is the residue resulting from the failure of a portion of the zinc vapor to become liquefied. By providing a number of the condensers 13 and locating them at different elevations in the height of the roasting chambers 4, the zinc vapor is more readily and completely carried off, and a greater percentage of the zinc is recoverable, than where fewer condensers are employed.

The heat for the roasting of the ore is obtained by the burning of illuminating gas, which may be derived from any suitable gas producer (not shown). The gas is supplied to the furnace by a common main 14, which is disposed along the front side of the furnace and is supported at intervals by piers 14'. The gas is drawn off from the pipe 14 at regular intervals corresponding to the number and location of the roasting ovens 4 by means of regulating valves 15, which are controlled independently by hand-levers 15'. By this arrangement of the valves 15, the gas for heating any one of the roasting ovens 4 may be turned on or turned off at will, by the operator simply manipulating the levers 15'. After the gas leaves the pipe 14 it flows through short horizontal passages 16 into vertical risers 17 disposed centrally in relatively thick division walls 18, which are disposed between the adjacent roasting ovens 4. The gas is burned in transverse flues 19, which are disposed at the opposite sides of each roasting oven, and are separated from said ovens by the relatively thin refractory linings or walls 4'. None of the gas employed for roasting the ore is burned in the chambers 4. The entire roasting of the ore and the distillation of the zinc being accomplished by heat which is radiated from the refractory linings 4'. After the gas is ignited, the flames are directed and travel back and forth in the flues 19 from the tops to the bottoms of the chambers 4, by means of horizontal baffle walls 19'; the direction of travel of the gas flames being indicated by the arrows in Figs. 2 and 4. The gas from the risers 17 is admitted to the flues 19 through horizontal passages or ports 20 (see Figs. 2, 5 and 6), and the amount of gas flowing to each set of flues 19 is controlled by a pair of refractory dampers or valves 21, by means of which the operator may regulate the quantity of gas to be burned, or he may shut off the supply of gas to one or more of the combustion flues 19, by closing the corresponding dampers 21. In order to effect the proper combustion of the gas, as well as to produce the requisite heat for the roasting of the ore, a certain amount of air (oxygen) must be mixed with the gas, and in the present case the air is preferably admitted to the combustion flues 19 and there mixed under suitable regulation. The air for this purpose is preferably preheated before it reaches the combustion flues 19, and this preheating is accomplished in a novel and simple manner, as follows: The supply of fresh air is admitted to the compartments 6, which contain the recuperating tubes 5, through gates 22, and upon reaching the said compartments the air circulates between and around the said tubes, which are always hot, and the temperature of the air is raised to a relatively high degree at these points. From the compartments 6 the hot air flows into risers 17', which parallel the gas risers 17, and are located near the rear side of the furnace, as shown in Figs. 2 and 5. The air passes from the risers 17' through ports 20' into the opposite ends of the flues 19 at different elevations and is there mixed with the burning gas. The volume of air to be mixed with the gas is also regulated by similar valves or dampers 21', which may be moved horizontally for closing the passage 20' leading to the flues 19. In order to enable the operator to readily inspect the interior of the flues 19, which generate the heat for roasting the ore, and to ascertain if any regulation is required, we provide a number of peep-holes 23 and 23' in the front and rear side walls of the furnace, which connect at the different levels with the horizontal or cross passages 20—20', and which are disposed in line with the several horizontal arms of the flues 19. These peep-holes are normally closed by plugs 24. The dampers 21—21' are operated by tongs or other suitable means (not shown), which may be inserted through the peep-holes. After the gas has burned back and forth through the labyrinthine flues 19, the waste products of combustion pass off rearwardly and downwardly through passages 25 into a common chimney 26, which extends horizontally parallel to the tunnel 3, and conducts the waste heat to boilers (not shown) for use in making steam, etc. The waste heat passages 25 are also provided with peep-holes 27, which are closed by plugs 27'. The chimney 26 is formed by the wall 2' and a third wall 2$^b$. The flues 19 of the adjacent roasting chambers 4 are separated by the relatively thick division walls 18, which serve as reservoirs for retaining the heat of the furnace.

The charging cars 11 are preferably arranged with a plurality of depending gated spouts 11$^a$, which register with the man-holes 5$^a$, through which the mixture (ore and carbon) gravitate into the chambers 4. As the vertical chambers 4 contain nothing but the reduction mixture, which is continuously being roasted by the radiated heat from the flues 19, the charging of the chambers naturally occurs at more or less regular intervals, and the drawing off of the refuse and residue through the recuperating flues 5 usually precedes each recharging operation, so as to provide suitable space at the top of the partially roasted masses for the reception of the new charges.

In the present case there are no retorts, such as have been formerly employed in many of the furnaces, which in addition to breakage and "butchering" and other troubles have caused considerable loss of zinc, through absorption by the retorts and by filtration through the retorts. Applicants utilize the entire space in the roasting chambers 4 for the reduction and distillation of the zinc, and as the vapor comes free from the ore, it passes directly into the condensers 13, which are conveniently located at the different elevations, with practically no loss, as compared with the older furnaces referred to. The feature of the non-communication of the combustion flues 19 with the roasting chambers 4, enables applicants to maintain the heat in the said chambers at substantially even temperature continuously, and the introduction of the fresh charges of the mixture at relatively low temperature cannot appreciably reduce the temperature of the ovens. The roasting chambers are so constructed and arranged that no cold air is admitted during the smelting operations; the only free vents being the lateral openings 12 which are normally closed by the condensers 13. The mixture is confined in the chambers 4 and is roasted and reduced alone by the heat which is radiated from the refractory walls 4'. And as the agency for the smelting heat is combustible gas and preheated air, which is consumed in the adjacent flues 19 entirely out of the contact with the mixture, the latter is continuously and effectually roasted for liberating the zinc vapor, while at the same time the residue which is rich in by-products is suitably reduced without the usual loss and deterioration such as has been suffered by the various old methods of direct firing, wherein the temperature of the ovens fluctuate widely due to the introduction of the cold mixture into the combustion chambers. Applicants are able to so regulate the charging and discharging of their roasting chambers that there need be no interruption of the distilling operations while waiting for the normal smelting temperature to be restored.

Our improved ore roasting furnace is extremely simple. The provision of the upright roasting chambers 4, which are maintained at a substantially even temperature by the radiated heat produced by the novel and effective combustion flues 19, in which the gas is burned continuously, under the control of novel and adequate regulating means, effects a great economy in labor, and increases the output of the furnaces without increasing the cost of maintenance and operation, and the further provision of the novel and simple means for discharging and conserving the refuse and residue, as well as the preheating of the air enhances the value of this invention.

Having thus described our invention, what we claim, is—

1. In a furnace, a casing formed with a plurality of upright roasting chambers, and horizontal flues in which gas is burned for heating said chambers by means of radiated heat, said flues disposed at the opposite sides of each chamber but not communicating therewith, means for drawing off the vapor and gases at different elevations in the height of said chambers, and a plurality of recuperating tubes communicating with the bottom of each chamber for discharging the refuse and for preheating air to be mixed with the gas.

2. A furnace superstructure formed with a plurality of vertical ore roasting ovens having charging manholes in their tops and having vents for the escape of vapor and gases arranged at different elevations in the height of the chambers, the portions of the casing between the chambers provided with combustion flues separated from the chambers by relatively thin refractory linings which radiate the heat for roasting and smelting the ore disposed in the chambers, a source of fuel gas, means for supplying the gas to said flues, and means for utilizing the hot refuse from the chambers for preheating air to be mixed with the gas in said flues.

3. In a roasting and smelting furnace, a superstructure formed with a plurality of vertical roasting chambers, and combustion flues disposed at the opposite sides of said chambers adapted to roast the ore in said chambers by heat radiated from the refractory walls which separate the flues from the chambers, the portions of said superstructure disposed between the chambers provided with independent gas and air risers which communicate with said flues, and the portion of said superstructure beneath said chambers provided with air-chambers, in which the air to be mixed with the fuel gas is preheated, and a plurality of recuperating tubes passing through said air-chambers and communicating with the bottoms of said roasting chambers for discharging the refuse therefrom.

4. In a roasting and smelting furnace, the combination of a casing formed with a plurality of vertical ore roasting ovens, and combustion flues disposed at the opposite sides of said ovens, in which gas mixed with preheated air is burned for heating said ovens by heat which is radiated from the walls which intervene between said ovens and said flues, said casing formed with an air-chamber beneath each oven, and with a common chimney which draws the waste products of combustion downwardly away from said flues, means for preheating the air in said air-chambers, and means for drawing off the vapor product of the roasting and smelting from different elevations in the height of said ovens.

5. In a smelting and roasting furnace, the combination of a casing formed with a plurality of transverse vertical ovens each provided with a plurality of vents for the escape of vapor at different levels in the height of said ovens, the portions of the casing between said ovens formed with serpentine combustion flues which are separated from said ovens by heat-radiating walls, and vertical gas and air passages disposed between the adjacent flues, the lower portion of said casing formed with air-chambers and a common chimney which draws the waste products of combustion from the lowermost portions of said flues, and means for preheating the air in said air chambers.

6. In a furnace for roasting and smelting ore, the combination of a casing formed with a plurality of vertical ovens having vents at their opposite ends for the escape of vapor and gases at different elevations in the height of said chambers, said casing formed with air-chambers directly beneath said ovens and with combustion flues which are separated from said ovens by relatively thin linings, in which gas is burned as it flows back and forth from the tops to the bottoms of said ovens, means for discharging the refuse from the bottoms of said ovens, and means for preheating air to be mixed with the gas in said flues by radiated heat derived from said refuse.

7. In a furnace, the combination of a refractory casing formed with vertical ovens, which receive ore by gravity through their tops, and which emit the products of distillation at different elevations in the height of the ovens, and serpentine flues disposed at the opposite sides of the ovens, said casing formed with independent risers for carrying gas and air to the flues, tubular refuse exits disposed in the bottoms of said ovens, dampers for regulating the admission of gas and air to the flues at different levels, valves for effecting the discharge of measured quantities of refuse from the ovens, and means for preheating the air by the hot refuse while the latter is passing through said exits.

8. In a furnace for roasting and distilling zinc ore, the combination of a casing formed with a plurality of vertical roasting chambers, each chamber having charging tubes in its top and discharging tubes in its bottom, the opposite ends of said chambers provided with vents arranged at different levels for the escape of the products of distillation, said casing formed with combustion flues disposed close to the opposite sides of the chambers and with air and gas passages disposed between the flues of the adjacent chambers and with a common chimney which draws the waste products of combustion away from the lowest level of the flues and said chambers, said casing between the flues comprising a relatively thick wall which serves as a reservoir for retaining the heat of the furnace, and means for increasing, decreasing and preventing the flow of gas and air to each of said flues.

9. A zinc furnace including a casing formed with a plurality of vertical roasting chambers, and with heating chambers intermediate the roasting chambers, and a recuperator below and communicating with the bottom of each chamber for discharging the refuse and for preheating the air for the heating chambers.

10. A furnace superstructure formed with a plurality of spaced vertical roasting chambers arranged to emit the products of distillation at different elevations in the height of said chambers, the ore in said chambers being roasted and smelted by heat which is radiated from the opposite side linings thereof, the said heat being produced by similar combustion flues which are disposed beyond the said linings in which gas which mixed with preheated air is burned as it flows back and forth from the tops to the bottoms of said chambers, the waste products of combustion from said flues being drawn downwardly into a common chimney which is formed longitudinally in the base of said superstructure, a plurality of tubes piercing the bottoms of said chambers for the discharge of refuse therefrom, the said tubes radiating heat derived from the hot refuse for preheating the air, rotary valves for regulating and measuring the discharge of the refuse, means for operating said valves simultaneously, and means for operating said valves independently.

11. In a furnace for roasting and smelting ores, a superstructure formed with vertical roasting chambers disposed between non-communicating combustion flues in which gas is burned for roasting the ore by heat radiated from the linings which separate the chambers from the flues, means for drawing off the products of the roasting from different levels in the height of said chambers, means for drawing off measured quantities of refuse from said chambers without interrupting the roasting operations, and means for heating air to be mixed with the gas by the hot refuse after said refuse leaves said chambers.

12. A zinc furnace including a superstructure formed with a plurality of vertical roasting chambers and intermediate division walls and two separate sets of horizontal heating flues in each division wall, the flues of each set being connected in series, and said superstructure being formed with vertical air and gas passages in each division wall between and communicating with the flues.

13. In a zinc smelting furnace, the combination of a superstructure formed with an ore roasting oven and with horizontal flues arranged in series at the opposite sides of the oven, the said oven being provided with openings for withdrawing the gaseous products at different levels, and with openings for discharging refuse, said superstructure being formed with separate passages for supplying gas and air to different parts of each flue, and means for preheating the air before it enters said passages by radiated heat derived from the oven refuse.

14. A zinc furnace superstructure formed with a plurality of vertical roasting chambers, and with horizontal heating flues in series intermediate the roasting chambers, and means for pre-heating the combustion air by the hot refuse.

15. A zinc roasting furnace comprising a number of spaced roasting ovens enclosed by a casing, the said casing at the opposite sides of each oven being formed with a number of connected horizontal flue-portions, said casing beneath each oven being formed with an air-chamber adapted to supply air to the flues of the corresponding oven, and tubes tapping the bottom of each oven and passing through said air-chamber adapted to carry off the oven refuse, and to preheat the air before it enters said flues.

In testimony whereof we affix our signatures.

AVERY T. LEAVITT.
CHARLES H. HUGHES.